United States Patent [19]

Ikeda

[11] 4,156,960

[45] Jun. 5, 1979

[54] METHOD OF MANUFACTING A WIRE PRINTER HEAD

[75] Inventor: Yoshiaki Ikeda, Tokyo, Japan

[73] Assignee: Kabushiki Kaisha Seikosha, Japan

[21] Appl. No.: 880,143

[22] Filed: Feb. 22, 1978

[30] Foreign Application Priority Data

Feb. 28, 1977 [JP] Japan ........................ 52-21313
Feb. 28, 1977 [JP] Japan ........................ 52-21314

[51] Int. Cl.[2] ........................ B23P 19/00

[52] U.S. Cl. ........................ 29/426; 29/434; 29/446; 29/464; 156/293; 400/124

[58] Field of Search ........................ 29/426, 434, 423, 446, 29/464; 156/293; 400/124

[56] References Cited

U.S. PATENT DOCUMENTS

| | | | |
|---|---|---|---|
| 3,010,045 | 11/1961 | Plagge et al. | 156/293 X |
| 3,575,366 | 4/1971 | Blum | 156/293 X |
| 3,797,629 | 3/1974 | Moser | 400/124 |
| 3,833,105 | 9/1974 | Howard | 400/124 |
| 3,889,793 | 6/1975 | Cattaneo | 400/124 |

*Primary Examiner*—Charlie T. Moon
*Attorney, Agent, or Firm*—Robert E. Burns; Emmanuel J. Lobato; Bruce L. Adams

[57] ABSTRACT

A method for manufacturing a wire printer head comprises providing a wireguide block comprised of a print wire, a hilt connected to the rear end portion of the print wire, a guide tube for guiding the print wire, a return spring for pushing the hilt rearward, a guide pipe for guiding the hilt, and a support plate having a hole therein in which is loosely fitted the guide pipe; and providing a wire driving block comprised of a lever for impacting the hilt, and an electromagnetic driving device for actuating the lever. The wire guide block is first connected to the wire driving block with the hilt directly contacting the lever; then the guide pipe is urged into contact with the hilt by a force weaker than that of the print wire return spring; and then an adhesive is applied to adhere the guide pipe within the support plate hole.

7 Claims, 7 Drawing Figures

METHOD OF MANUFACTING A WIRE PRINTER HEAD

BACKGROUND OF THE INVENTION

The present invention relates to a wire printer head and a method for manufacturing thereof.

A wire printer head consists of a wire guide block for slidably supporting a plurality of print wires and a driving block for impacting the print wires. The print wires are disposed adjacent to one another in a vertical line at their top end portions and they are bent radially rearward. Hilts secured to the rear ends of the print wires are disposed in a circle, for example, according to the shape of the driving block, and face to drive levers of the driving block. Therefore the directions of movement of the hilts differ one another, and it is very difficult to guide the hilts. Conventionally a guide plate is employed to guide the hilts but it is technically very difficult to bore guide holes aslant in the guide plate, so guide holes are bored vertically in the guide plate and then the guide plate is curved in order to adjust the guide holes to the respective directions of the hilts. However, in such case, since the direction of the hilts differ one another as described above, it is almost impossible to precisely direct the guide holes to the respective directions of the hilts. Therefore, frictional resistances between the hilts and the guide holes respectively differ from one another resulting scattering response characteristics of the print wires and wearing-out of guide holes due to biasing of the hilts against the holes. Further in conventional art, the positional relations between the hilts and the drive levers are adjusted by screws or eccentric shafts which brings about complex structure and is laborious in adjusting.

SUMMARY OF THE INVENTION

According to a feature of the present invention there is provided a wire printer head comprising; a print wire, a hilt connected to the rear end portion of said print wire, a return spring for pushing said hilt rearward, a guide pipe for said hilt, and a support plate provided with a hole whose diameter is larger than that of said guide pipe, wherein said guide pipe being connected to said support plate at said hole by an adhesive in a posture corresponding to the direction of said hilt.

One object of the present invention is to provide a wire printer head and method for manufacturing thereof in which guide pipes for hilts of print wires are properly supported.

Another object of the present invention is to provide a wire printer head and method for manufacturing thereof in which positional relation between hilts of print wires and drive levers are uniform.

BRIEF DESCRIPTION OF THE DRAWINGS

Above objects, other objects and characteristic features of the present invention will be more readily understood from the following description and claims taken in conjunction with the accompanying drawings, in which.

DESCRIPTION OF A PREFERRED EMBODIMENT

Figure 1:
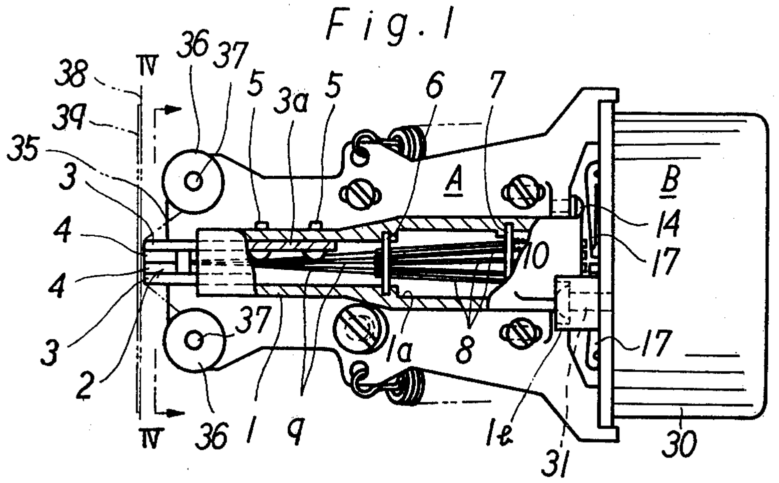
FIG. 1 is a plan view, partly in section, of an embodiment according to the present invention.
Figure 2:
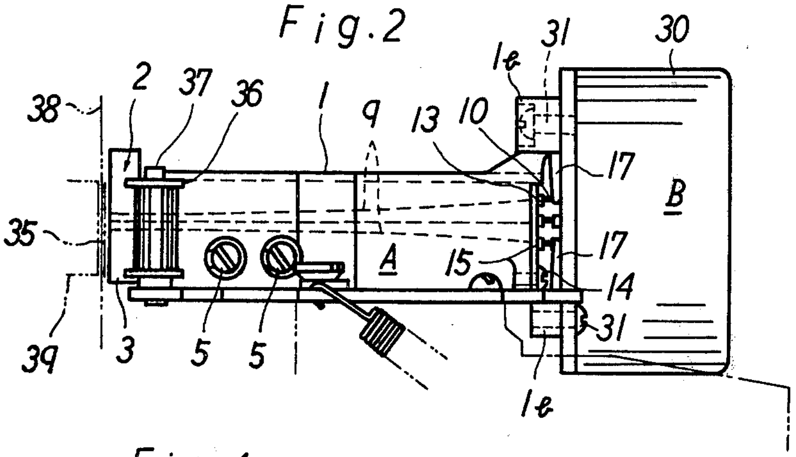
FIG. 2 is an elevational view, partly in section, of the embodiment of FIG. 1.
Figure 4:
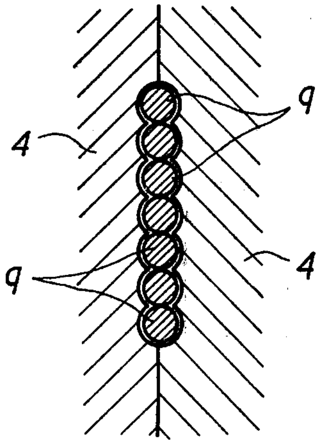
FIG. 4 is an enlarged section along lines IV—IV in FIG. 1.
Figure 5:
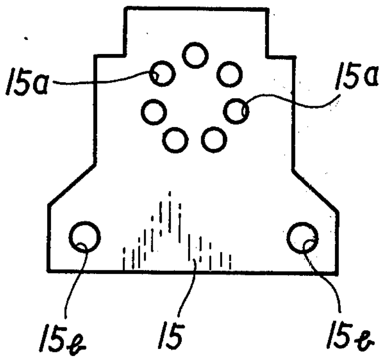
FIG. 5 is an enlarged view of the support plate.
Figure 3:
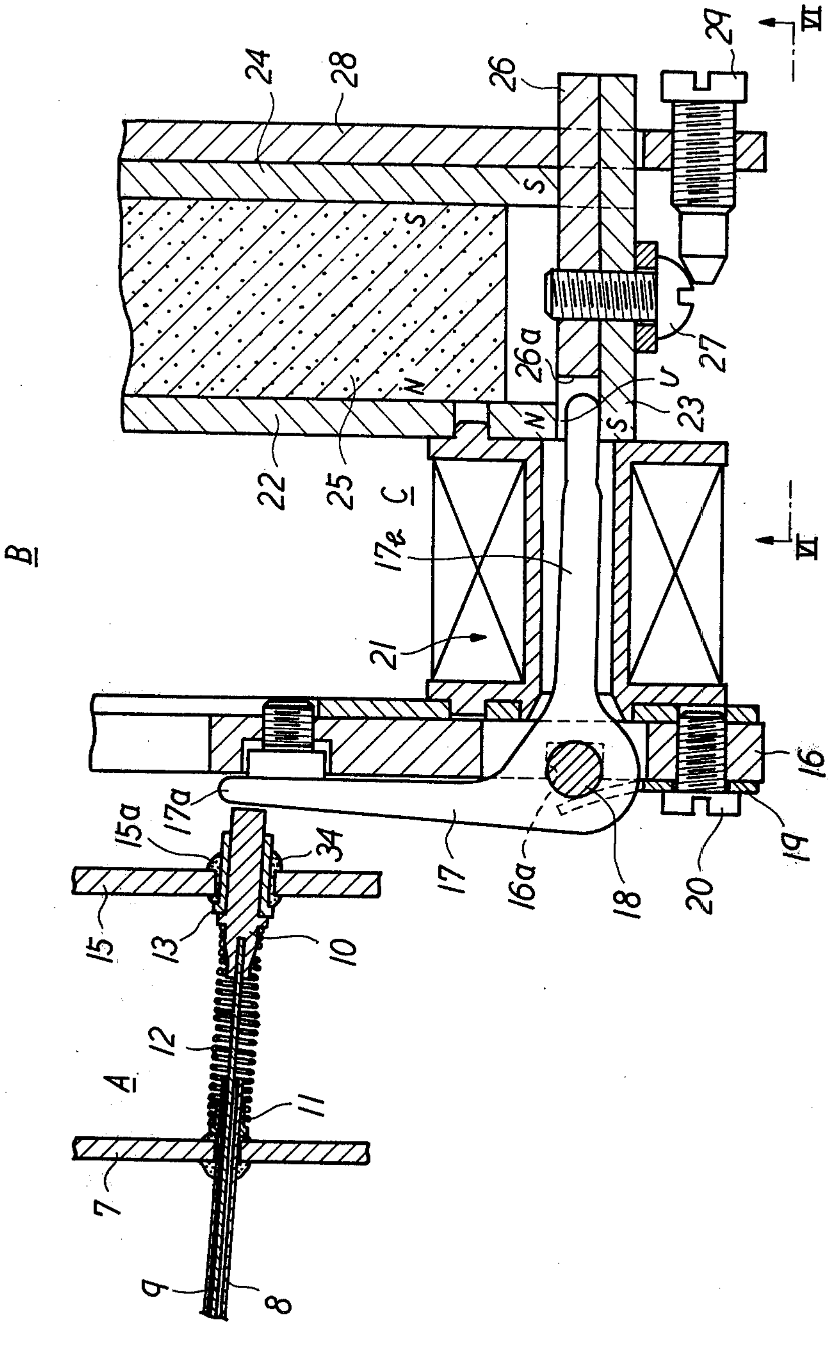
FIG. 3 is an enlarged section of an essential part of the embodiment.
Figure 6:
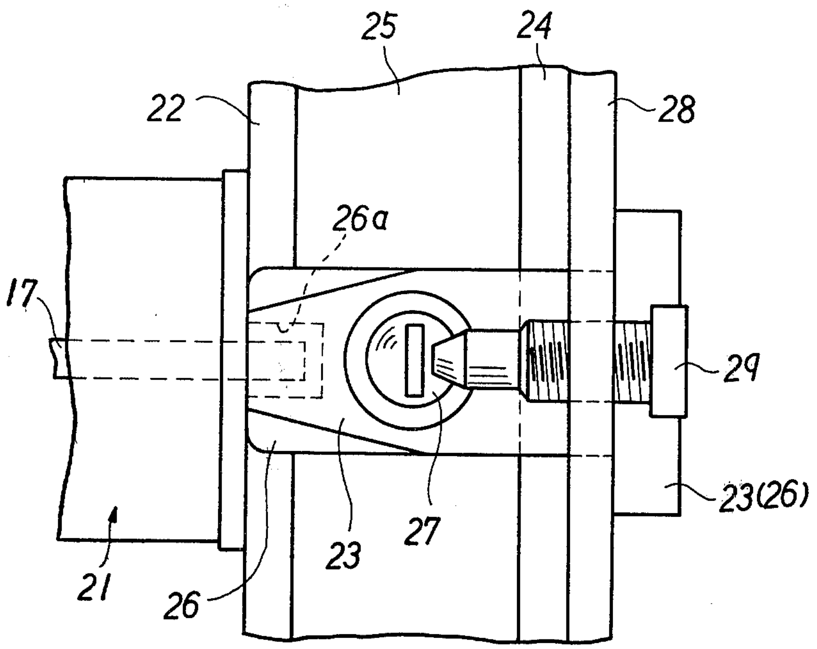
FIG. 6 is a bottom view of along lines VI—VI in FIG. 3.

A wire printer head according to our present invention consists of a wire guide block A and a wire driving block B as shown in FIGS. 1, 2 and 3. The wire guide block A is first explained. To top end portion of a frame 1, a top guide 2 is secured. The top guide comprises side plates 3,3 and guide plates 4,4 sandwiched between the side plates. Elongated portion 3*a* of one side plate 3 is secured to the frame 1 by screws 5,5. The position of the guide means 2 can be adjusted. In the hollow 1*a* of the frame 1, are secured support plates 6,7 for supporting both ends portions of a plurality of guide pipes 8. A plurality of print wires 9, seven print wires in the present embodiment, are slidably supported in the predetermined directions by the top guide 2 and the guide tubes 8. The top ends of the print wires 9 are aligned in one vertical line in close relation to one another by the guide plates 4,4 as shown in FIG. 4, and the wires extend rearward radially and circularly leaving predetermined spaces therebetween. A hilt 10 is secured to the rear end portion of each print wire 9. A return spring 12 is provided between the hilt 10 and a washer 11 secured to the guide tube 8, and it pushes the print wire 9 rearward. Guide pipes 13 are supported by a support plate 15, which is further secured to the rear part of the frame 1 by screws 14,14. As shown in FIG. 5 the support plate 15 is provided with seven holes 15*a* disposed circularly and holes 15*b*, 15*b* through which the screws 14,14 penetrate. The each hole 15*a* has a diameter greater than the outside diameter of the guide pipe 13. The guide pipes 13 can be loosely disposed in the holes 15*a* in natural postures corresponding to the directions of the hilts 10. The guide pipes restrict the backward positions of the hilts 10 and they are secured to the support plate in a manner described hereinafter.

Next, the wire driving block B will be described.

Referring FIG. 3, a base plate 16 is provided with concaved portions 16*a* in which shafts 18 of L-shaped drive levers 17 are rotatably supported. Push levers 19 are secured to the base plate 16 by screws 20, and their free end portions push the shafts 18 so that the shafts may not get off. End portion 17*a* of one arm of each drive lever 17 faces the hilt 10 and the other arm 17*b* protrudes through a solenoid 21 which is a component part of an electric magnetic driving means C. The end portion of the arm 17*b* is located in a space V between a interior yoke 22 and a separate yoke 23. A permanent magnet 25 is provided between the interior yoke 24 and an exterior yoke 24, and the interior yoke 22 is magnetized N pole and the exterior yoke and the separate yoke 23 are magnetized S pole. The separate yoke 23 and a spacer 26 made of non-magnetic material are connected by a screw 27. Top of a screw 29 penetrating through the back plate 28 pushes the head of the screw 27 thereby supporting the spacer 26 in a pressed state between the interior yoke 22 and the end portion of the exterior yoke 24. The space V is defined by the thickness of the spacer 26. The spacer 26 is provided with a cutout 26*a*. Seven sets of the drive lever 17 and the electric magnetic driving means C are provided on the base plate 16. The driving block B is set in a cover 30. The frame 1 of the wire guide block A is integrally provided with connecting portions *1b* through which screws 31 penetrate. The base plate 16 of the wire driving block B is provided with interior screw holes (not shown in the drawings) at positions facing the connecting portions *1b*.

Figure 7:
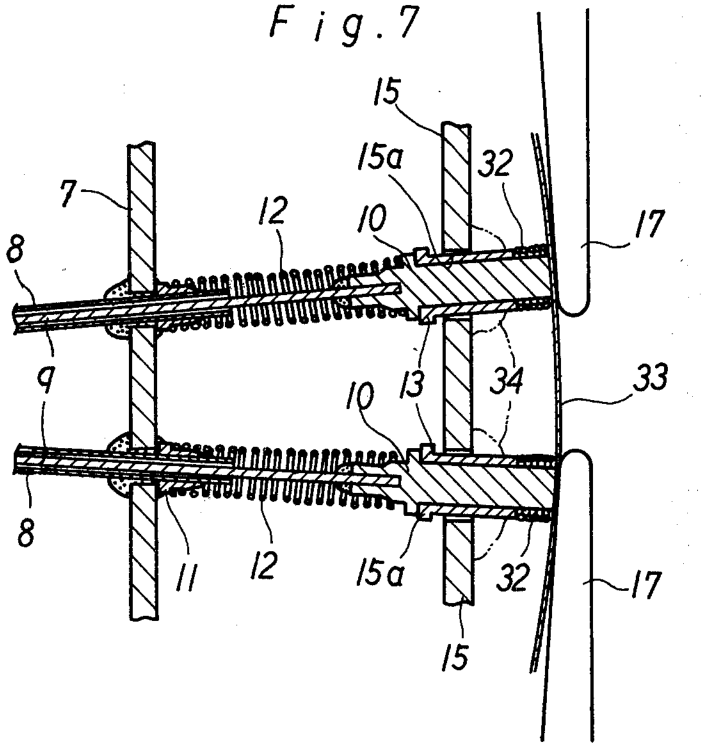
FIG. 7 is an explanatory view of the embodiment.

Suppose the guide pipes 13 are still loosely set in the holes 15*a* of the support plate 15. The wire guide block A and the wire driving block B are separately assembled and the two blocks are connected in the following manner. Refering FIG. 7, coil springs 32 are set about the hilts 10 protruding from the guide pipes 13 and further spacers 33 are set between the hilts 10 and the drive levers 17. Under this state, the wire guide block A and the wire driving block B are connected by the screws 31. Each spacer 33 define the gap between the hilt 10 and the drive lever 17 to a desired degree, about forty to fifty microns in the present embodiment. As a spacer 33, high quality paper or Mylar (polyester thin sheet) which is of high accuracy in thickness and of high flexibility. The coil spring 32 is weaker than the return spring 12, and it pushes the guide pipe 13 to the hilt 10. The hilt 10 is pushed to the drive lever 17 interposing the spacer 33 therebetween by force of the return spring, and the guide pipe 13 is pushed by the coil spring 32 to the hilt 10. Then an adhesive 34 is spread on the joint portion between the guide pipe 13 and the support plate 15. The adhesive 34 permeate into the hole 15 a by capillary phenomenon. When the adhesive 34 solidify, the guide pipe 13 is firmly secured to the support plate 15. The adhesive 34 is preferably thermosetting resin of high adhesive strength and heat-resisting, such as resin in epoxy resin group. After the adhesive 34 has completely solidified, the screw 31 is unscrewed, the wire guide block A and the wire driving block B are separated temporarily, and the spacer 33 and the coil springs 32 are removed. Then the wire guide block A and the wire driving block B are again connected by the screws 31 as shown in FIGS. 1 and 2. Top ends of the print wires 9 facing a platen 39 are polished to align evenly. The top guide 2 is adjusted to proper position and it is fixed. Thus the whole manufacturing process is completed. The hilts 10 are defined their backward positions by the guide pipes 13 and spaces between the hilt 10 and the drive levers 17 are made even distance which is the thickness of the spacer 33.

Besides the method described above another alternative method can be employed. That is, the hilts 10 are directly contacted to the drive levers 17 instead of using the spacer 33 while connecting the guide pipes 13 to the support plate 13, and the guide pipes are connected to the support plate 15. Then the wire guide block A and the wire driving block B are temporarily separated, and they are again connected interposing a spacer therebetween. Instead of the coil springs 32, the weight of the guide pipes 13 may be used for contacting the guide pipes to the hilts 10. Further, if it is desirable not to leave a gap between the hilt 10 and the drive lever 17, the spacer 33 may not be used.

In FIGS. 1 and 2, reference nuneral 35 designates an inkribbon, reference numeral 36 designates a pulley for the inkribbon rotatable about a shaft 37, reference numeral 38 designates a print paper and reference numeral 39 designates a platen.

What is claimed is:

1. A method for manufacturing a wire printer head which comprises:

providing; a wire guide block comprising, a print wire, a hilt connected to the rear end portion of said print wire, a guide tube for said print wire, a return spring for pushing said hilt rearward, a guide pipe for said hilt and a support plate provided with a hole in which said guide pipe loosely fits, and a wire driving block comprising, a lever for impacting said hilt, and an electromagnetic driving means for actuating said lever:

connecting said wire guide block to said wire driving block with said hilt directly contacting said lever:

contacting said guide pipe to said hilt by a pushing means whose force is weaker than that of said return spring: and spreading adhesive agent to the engaged portion between said guide pipe and said hole thereby fixing said guide pipe to said support plate in said hole.

2. A method for manufacturing a wire printer head according to claim 1, wherein said pushing means is a coil spring.

3. A method for manufacturing a wire printer head according to claim 2, wherein the weight of said guide pipe being used as said pushing means.

4. A method for manufacturing a wire printer head which comprises:

providing; a wire guide block comprising, a print wire, a hilt connected to the rear end portion of said print wire, a guide tube for said print wire, a return spring for pushing said hilt rearward, a guide pipe for said hilt and a support plate provided with a hole in which said guide pipe loosely fits, and a wire driving block comprising, a lever for impacting said hilt, and an electromagnetic driving means for actuating said lever:

connecting said wire guide block to said wire driving block with a spacer inserted between said hilt and said lever:

contacting said guide pipe to said hilt by a pushing means whose force is weaker than that of said return spring:

spreading adhesive agent to the engaged portion between said guide pipe and said hole thereby fixing said guide pipe to said support plate in said hole:

disconnecting said wire guide block from said wire driving block thereby removing said spacer and said pushing means: and connecting again said wire guide block and said wire driving block.

5. A method for manufacturing a wire printer head according to claim 4, wherein said pushing means is a coil spring.

6. A method for manufacturing a wire printer head according to claim 4, wherein the weight of said guide pipe being used as said pushing means.

7. A method for manufacturing a wire printer head which comprises:

providing; a ware guide block comprising, a print wire, a hilt connected to the rear end portion of said print wire, a guide tube for said print wire, a return spring for pushing said hilt rearward, a guide pipe for said hilt and a support plate provided with a hole in which said guide pipe loosely fits, and a wire driving block comprising, a lever for impacting said hilt, and an electromagnetic driving means for actuating said lever:

connecting said wire guide block to said wire driving block with said hilt directly contacting said lever:

contacting said guide pipe to said hilt by a pushing means whose force is weaker than that of said return spring:

spreading adhesive agent to the engaged portion between said guide pipe and said hole thereby fixing said guide pipe to said support plate in said hole:

disconnecting said wire guide block from said wire driving block:

inserting a spacer between said hilt and said lever: and connecting again said wire guide block and said wire driving block.

* * * * *